United States Patent
Hwang

(10) Patent No.: US 9,483,140 B2
(45) Date of Patent: Nov. 1, 2016

(54) TOUCH SENSOR

(71) Applicant: Dongbu Hitek Co., Ltd., Gyeonggi-do (KR)

(72) Inventor: Tae Ho Hwang, Busan (KR)

(73) Assignee: Dongbu Hitek Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/662,587

(22) Filed: Mar. 19, 2015

(65) Prior Publication Data

US 2016/0011711 A1    Jan. 14, 2016

(30) Foreign Application Priority Data

Jul. 8, 2014  (KR) .................. 10-2014-0085061

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0418* (2013.01)

(58) Field of Classification Search
CPC ..... G06F 3/0416; G06F 3/044; G06F 3/0418
See application file for complete search history.

(56) References Cited

U.S. PATENT DOCUMENTS

| | | | |
|---|---|---|---|
| 6,255,604 B1 * | 7/2001 | Tokioka | G06F 3/045 178/18.01 |
| 9,214,938 B2 * | 12/2015 | Ballan | H03K 17/962 |
| 9,280,238 B2 * | 3/2016 | Posamentier | G06F 3/041 |
| 2013/0076697 A1 * | 3/2013 | Goertz | G06F 3/0421 345/175 |
| 2015/0002176 A1 * | 1/2015 | Kwon | G06F 3/0416 324/679 |
| 2015/0248188 A1 | 9/2015 | Heo | |
| 2015/0268760 A1 | 9/2015 | Park | |

FOREIGN PATENT DOCUMENTS

| | | |
|---|---|---|
| KR | 1020120034500 | 4/2012 |
| KR | 1020140066600 | 6/2014 |

* cited by examiner

*Primary Examiner* — Abbas Abdulselam
(74) *Attorney, Agent, or Firm* — Patterson Thuente Pedersen, P.A.

(57) ABSTRACT

Disclosed is a touch sensor including a touch panel including driving lines and sensing lines, a node capacitor being formed between the neighboring driving and sensing lines, and a sensing unit electrically connected to the sensing lines to sense variation in the capacitance of the node capacitor. The sensing unit includes an amplifier including a first input terminal configured to receive a signal from any one of the sensing lines, a second input terminal connected to a first power source, and an output terminal, a feedback capacitor connected between the first input terminal and the output terminal, and a current controller connected in parallel to the feedback capacitor between the first input terminal and the output terminal to control current flowing to the feedback capacitor.

15 Claims, 6 Drawing Sheets

TOUCH SENSOR

This application claims the benefit of Korean Patent Application No. 10-2014-0085061, filed on Jul. 8, 2014 which is hereby incorporated by reference in its entirety as if fully set forth herein.

BACKGROUND OF THE INVENTION

1. Field of the Invention

Embodiments relate to a touch sensor.

2. Discussion of the Related Art

An input to a touch sensor may include a driving signal input through capacitance between a sensing electrode and a driving electrode of a touch panel and a noise signal input through capacitance between an object (e.g., a finger) touching the touch panel and a sensing node of the touch panel. A sensed signal may be an overlapped signal of the two signals.

A sensing unit of the touch sensor senses variation in mutual-capacitance of the touch panel and a digital processor of the touch sensor performs a digital signal processing of the sensed mutual-capacitance variation. When digital signal processed information is transmitted to a firmware, the firmware performs a calculation to extract x-y coordinate information and transmits the x-y coordinate information as final touch position information to a host. The resolution of information transmitted from the digital processor may be an index of accuracy of a coordinate calculation performed by the firmware.

In some cases, noise may be introduced to the signal detected by the touch sensor. For example, a fluorescent lamp located near the touch sensor or a charging device coupled to the touch sensor may cause interference with the output of an amplifier (for example, a calculation amplifier) included in an analog signal sensing unit of the touch sensor. This interference may cause the output to deviate from a normal operation range or overlap with noise, thus distorting the waveform of the output of the analog signal sensing unit. This distortion may prevent normal transmission of touch information.

SUMMARY OF THE INVENTION

Accordingly, embodiments are directed to a touch sensor that substantially obviates one or more problems due to limitations and disadvantages of the related art.

An object of embodiments is to provide a touch sensor which is capable of reducing the gain of an amplification unit under an environment in which high voltage noise is introduced without increasing the size of a feedback capacitor. By maintaining the area of the feedback capacitor, the overall circuit area is reduced, thus reducing the price of a sensing unit while still offering the ability to reduce the gain of the amplification unit in response to high voltage noise.

Additional advantages, objects, and features of the embodiments will be set forth in part in the description which follows and in part will become apparent to those having ordinary skill in the art upon examination of the following or may be learned from practice of the embodiments. The objectives and other advantages of the embodiments may be realized and attained by the structure particularly pointed out in the written description and claims hereof as well as the appended drawings.

To achieve these objects and other advantages and in accordance with the purpose of embodiments, as embodied and broadly described herein, a touch sensor includes a touch panel including driving lines and sensing lines, a node capacitor being formed between the neighboring driving and sensing lines, and a sensing unit electrically connected to the sensing lines to sense variation in the capacitance of the node capacitor. The sensing unit includes an amplifier. The amplifier includes a first input terminal configured to receive a signal from any one of the sensing lines, a second input terminal connected to a first power source, and an output terminal. The sensing unit also includes a feedback capacitor connected between the first input terminal and the output terminal, and a current controller connected in parallel to the feedback capacitor between the first input terminal and the output terminal. The current controller controls current flowing to the feedback capacitor.

The current controller may be a constant current limiter configured to supply predetermined current.

The current controller may be a variable resistor capable of providing a variable resistance value.

The current controller may be a pass transistor configured to operate in response to a first control signal and a second control signal.

The current controller may further include a feedback resistor connected between the first input terminal and the output terminal. The feedback resistor may be connected in parallel to the pass transistor and the feedback capacitor.

Current introduced to the first input terminal may be divided into a first current flowing to the feedback capacitor and a second current flowing to the current controller.

It is to be understood that both the foregoing general description and the following detailed description of the embodiments are exemplary and explanatory and are intended to provide further explanation of the invention as claimed.

BRIEF DESCRIPTION OF THE DRAWINGS

The accompanying drawings, which are included to provide a further understanding of the embodiments and are incorporated in and constitute a part of this application, illustrate embodiment(s) of the embodiments and together with the description serve to explain the principle of the embodiments. In the drawings.

DETAILED DESCRIPTION OF THE INVENTION

Figure 1:
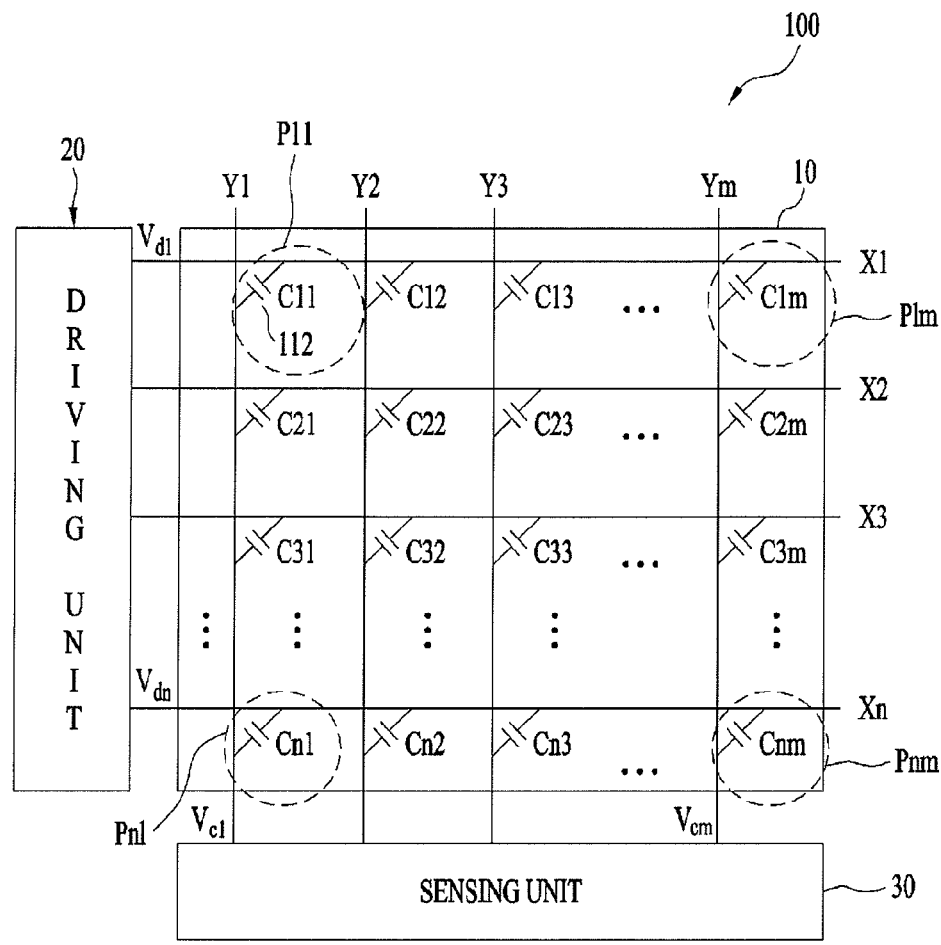
FIG. 1 is a block diagram of a touch sensor according to some exemplary embodiments.

Hereinafter, the embodiments will be clearly appreciated through the accompanying drawings and the following description thereof. In the description of the embodiments, it will be understood that, when an element such as a layer, film, region, pattern or structure is referred to as being formed "on" or "under" another element, such as a substrate, layer, film, region, pad or pattern, it can be directly "on" or "under" the other element or be indirectly formed with intervening elements therebetween. It will also be understood that "on" or "under" the element may be described relative to the drawings.

In the drawings, the size of each layer may be exaggerated, omitted or schematically illustrated for clarity and convenience. In addition, the size of each constituent element does not wholly reflect an actual size thereof. In addition, the same reference numerals designate the same constituent elements throughout the description of the drawings.

FIG. 1 is a block diagram of a touch sensor 100 according to an exemplary embodiment.

Referring to FIG. 1, the touch sensor 100 includes a touch panel 10, a driving unit 20, and a sensing unit 30.

The touch panel 10 provides a plurality of sensing nodes P11 to Pnm, where n and m are natural numbers greater than 1, which function substantially independently from one another at different positions on the touch panel 10.

The sensing nodes P11 to Pnm may also be referred to as, for example, coordinates, sensing points, nodes, or a sensing node array.

For example, the touch panel 10 may include a plurality of driving lines X1 to Xn, a plurality of sensing lines Y1 to Ym, and node capacitors C11 to Cnm formed between the neighboring driving and sensing lines.

The driving lines X1 to Xn may also be referred to as, for example, driving signal lines or driving electrodes.

In addition, the sensing lines Y1 to Ym may also be referred to as, for example, sensing signal lines or sensing electrodes.

Although FIG. 1 illustrates the driving lines and the sensing lines as intersecting each other, embodiments are not limited thereto and the driving lines and the sensing lines may be configured so as not to intersect each other.

Any one sensing node (e.g., P11) may be defined by any one node capacitor (e.g., C11) formed between any one driving line (e.g., X1) and any one sensing line (e.g., Y1) adjacent to the driving line X1.

For example, a driving line Xi, where i is a natural number greater than 0 and equal to or less than n, may be insulated and separated from a sensing line Yj, where j is a natural number greater than 0 and equal to or less than m, and a node capacitor Cij may be formed between the driving line Xi and the sensing line Yj.

For example, the touch panel 10 may include an electrode pattern layer (not illustrated) including a sensing electrode and a driving electrode spaced apart from each other, a substrate (not illustrated) disposed at the front of the electrode pattern layer, and an insulation layer (not illustrated) disposed at the back of the electrode pattern layer. The layout of the electrode pattern layer may have various shapes according to design methods.

The electrode pattern layer may comprise a light-transmitting conductive material such as, for example, at least one selected from among Indium Tin Oxide (ITO), Tin Oxide (TO), Indium Zinc Oxide (IZO), Indium Tin Zinc Oxide (ITZO), Indium Aluminum Zinc Oxide (IAZO), Indium Gallium Zinc Oxide (IGZO), Indium Gallium Tin Oxide (IGTO), Aluminum Zinc Oxide (AZO), Antimony Tin Oxide (ATO), Gallium Zinc Oxide (GZO), Carbon Nano Tube (CNT), a conductive polymer, and a transparent silver or copper ink.

The electrode pattern layer may be applied to one or more layers formed of glass or plastic to form an array of the sensing nodes P11 to Pnm.

The substrate may take the form of a dielectric film having a high light transmittance. For example, the substrate may comprise at least one selected from among glass, polyethylene terephthalate (PET), polyethylene naphthalate (PEN), polyimide (PI), and acryl.

The insulation layer may be a light transmitting insulation layer such as, for example, a PET layer. In another embodiment, a shield layer (not illustrated) may be disposed under the insulation layer in order to eliminate noise and electromagnetic interference (EMI) through the electrode pattern layer.

The touch panel 10 may be merged with a display layer according to an appropriate panel design method and may share a driving or sensing path. In a case of a touch panel not combined with a display device, a 2-dimensional (2D) sensing node array may be configured via an appropriate method. The embodiment may be applied to all touch sensing systems including a 2D sensing node array.

The driving unit 20 may be electrically connected to the driving lines X1 to Xn (and provide driving signals $V_{d1}$ to $V_{dn}$ to the driving lines X1 to Xn.

The driving unit 20 may simultaneously provide driving signals to at least one or more driving lines among the driving lines X1 to Xn.

For example, the driving unit 20 may sequentially provide driving signals to the respective driving lines X1 to Xn, or may simultaneously provide driving signals to two or more driving lines.

Here, "simultaneously" may include almost simultaneous incidents as well as precisely simultaneous incidents. For example, simultaneously occurring incidents may mean incidents that almost simultaneously start and almost simultaneously terminate, and/or incidents that occur during at least partially overlapping periods of time.

The driving unit 20 may include driving circuits to provide the driving signals $V_{d1}$ to $V_{dn}$ to the driving lines X1 to Xn.

Figure 2:
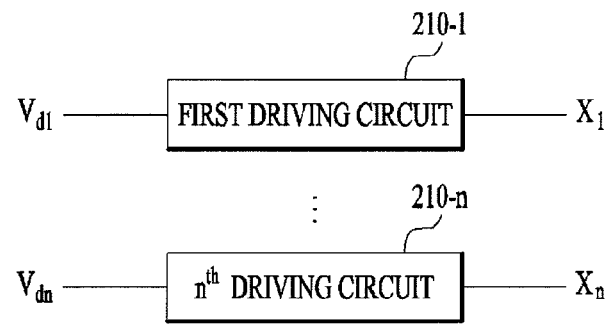
FIG. 2 is a block diagram illustrating an exemplary embodiment of a driving unit illustrated in FIG. 1.

FIG. 2 is a block diagram illustrating an embodiment of the driving unit 20 illustrated in FIG. 1.

Referring to FIG. 2, the driving unit 20 may include first to $n^{th}$ driving circuits 210-1 to 210-n, where n is a natural number greater than 1.

The first to $n^{th}$ driving circuits 210-1 to 210-n may provide the driving signals $V_{d1}$ to $V_{dn}$ to the driving lines X1 to Xn.

For example, each of the first to $n^{th}$ driving circuits 210-1 to 210-n may provide a corresponding one of the driving signals $V_{d1}$ to $V_{dn}$ to a corresponding one of the driving lines X1 to Xn.

The sensing unit 30 may be electrically connected to the sensing lines Y1 to Ym, where m is a natural number greater than 1, and sense the capacitance of the node capacitor between the driving line to which the driving signal is applied and the sensing line corresponding to the driving line.

Figure 3:
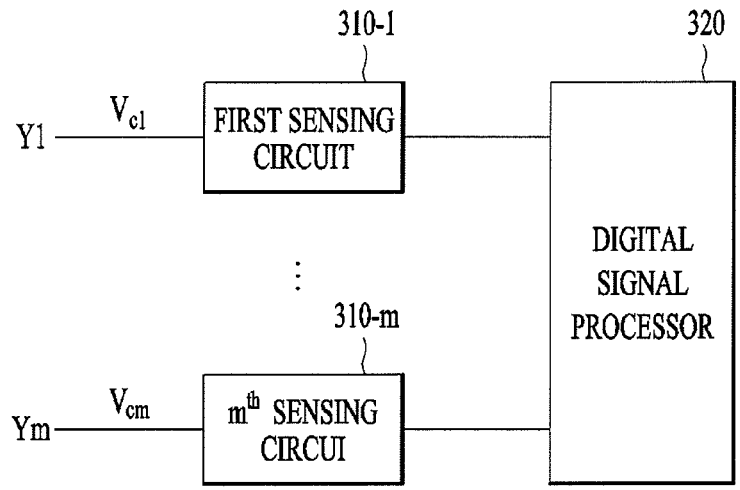
FIG. 3 is a block diagram illustrating an exemplary embodiment of a sensing unit illustrated in FIG. 1.

FIG. 3 is a block diagram illustrating an embodiment of the sensing unit 30 illustrated in FIG. 1.

Referring to FIG. 3, the sensing unit 30 includes first to $m^{th}$ sensing circuits 310-1 to 310-m, where m is a natural number greater than 1, and a digital signal processor 320.

Each of the first to $m^{th}$ sensing circuits 310-1 to 310-m may be connected to a corresponding one of the sensing lines Y1 to Ym and sense a signal received through the corresponding sensing line.

The digital signal processor 320 detects variation in capacitance of the sensing nodes P11 to Pnm based on results sensed by the first to $m^{th}$ sensing circuits 310-1 to 310-m.

The digital signal processor 320 may perform a processing of digital signals DS1 output from the first to $m^{th}$ sensing circuits 310-1 to 310-m using various digital signal processing methods (example e.g., filtering, amplification, noise removal, or signal detection).

For example, the digital signal processor 320 may perform a digital signal processing of a comparison signal CS that is an output of a comparator 420.

Figure 4:
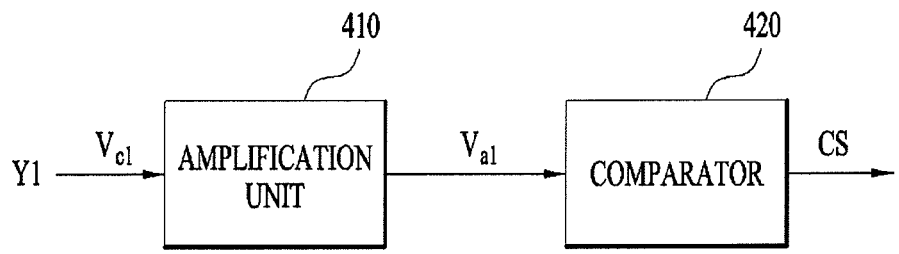
FIG. 4 is a view illustrating an exemplary embodiment of a first sensing circuit illustrated in FIG. 3.

FIG. 4 is a view illustrating an embodiment of the first sensing circuit 310-1 illustrated in FIG. 3.

The respective sensing circuits 310-1 to 310-m illustrated in FIG. 3 may have the same configuration. Thus, the configuration of only the first sensing circuit 310-1 will be described below and a description of the others will be omitted to avoid repetition. Although the present example is described as if each of the respective sensing circuits have the same configuration, it should be appreciated that, in some embodiments, the sensing circuits may have different configurations.

Referring to FIG. 4, the first sensing circuit 310-1 may include an amplification unit 410 configured to amplify a signal $V_{c1}$ received through the first sensing line Y1 and to output an amplified signal $V_{a1}$ and an analog-digital converter 420 for analog-digital conversion of the amplified signal $V_{a1}$.

Figure 5:
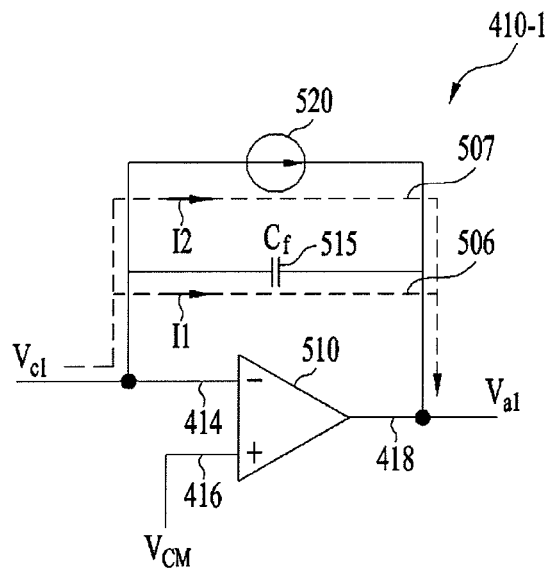
FIG. 5 is a view illustrating an exemplary embodiment of an amplification unit illustrated in FIG. 4.

FIG. 5 is a view illustrating an embodiment 410-1 of the amplification unit 410 illustrated in FIG. 4.

Referring to FIG. 5, the amplification unit 410-1 amplifies a signal $V_{c1}$ received through the first sensing line Y1 and outputs an amplified signal $V_{a1}$.

The amplification unit 410-1 includes an amplifier 510, a feedback capacitor 515, and a current controller 520.

Current flowing between a first input terminal 414 and an output terminal 418 may be divided into the feedback capacitor 515 and the current controller 520 and current flowing to the feedback capacitor 515 may be controlled by current flowing to the current controller 520. For example, the current controller 520 may be a constant current limiter.

The amplifier 510 may include the first input terminal 414 (e.g., an inverting input terminal) connected to any one sensing line Y1 of the sensing lines Y1 to Ym (m being a natural number greater than 1), a second input terminal 416 (e.g., a non-inverting input terminal) connected to a first power source $V_{CM}$, and the output terminal 418 to output an amplified signal $V_{a1}$.

The first power source $V_{CM}$ may be a ground GND. In some embodiments, the ground may be a virtual ground created by a feedback route between the output terminal 418 of the amplifier 510 and the first input terminal 414.

The amplifier 510 may be a differential amplifier to differentially amplify a first signal $V_{c1}$ input to the first input terminal 414 and a second signal $V_{CM}$ (e.g., a first power) input to the second input terminal 416.

For example and without limitation, the amplifier 510 may be a calculation amplifier in the form of a field effect transistor (FET) or a bipolar junction transistor (BJT).

The feedback capacitor 515 may be electrically connected between the first input terminal 414 and the output terminal 418 of the amplifier 510 to create a first current path 506 from the first input terminal 414 to the output terminal 418. A first current I1 may flow in the first current path 506.

The feedback capacitor 515 may serve to provide negative feedback to the output signal $V_{a1}$ of the amplifier 510 to the first input terminal 414.

Although not illustrated in FIG. 5, in another embodiment, the amplification unit 410-1 may further include a feedback resistor (not illustrated) electrically connected between the first input terminal 414 and the output terminal 418 of the amplifier 510. For example, the feedback resistor and the feedback capacitor 515 may be connected in parallel between the first input terminal 414 and the output terminal 418 of the amplifier 510.

The constant current limiter 520 may be electrically connected between the first input terminal 414 and the output terminal 418 of the amplifier 510. For example, the feedback capacitor 515 and the constant current limiter 520 may be connected in parallel between the first input terminal 414 and the output terminal 418 of the amplifier 510.

The constant current limiter 520 may create a second current path 507 between the first input terminal 414 and the output terminal 418 of the amplifier 510 and cause predetermined second current I2 to flow in the second current path 507. For example, the constant current limiter 520 may supply predetermined second current I2 to the second current path 507.

Current flowing between the first input terminal 414 and the output terminal 418 may be the sum of current flowing to the feedback capacitor 515 and current flowing to the constant current limiter 520. Current flowing to the feedback capacitor 515 may be controlled by current flowing to the constant current limiter 520.

As described above, in previously known touch sensors, the output of an amplification unit of a sensing unit may deviate from a normal operation range due to high voltage noise introduced to an input terminal of the sensing unit. This noise may cause distortion of the output waveform of the sensing unit and make it impossible to normally extract touch information.

While increasing the capacitance of a feedback capacitor of the sensing unit may prevent the output of the amplification unit from deviating from a normal operation range due to high voltage noise, such increased capacitance may increase the circuit area of the sensing unit.

In some embodiments, under an environment in which high voltage noise is introduced to the amplification unit 410-1 of the sensing unit 30, it is possible to reduce current I1 flowing to the feedback capacitor 515 through an additional current path created by the constant current limiter 520 without increasing a capacitance value of the feedback capacitor 515, thus resulting in a reduction in the gain of the amplification unit 410-1. This is because the feedback capacitor 515 has an alternating current (AC) resistance component. A voltage applied between the first input terminal 414 and the output terminal 418 decreases when the current I1 decreases, thus causing reduction in the gain of the amplification unit 410-1.

That is, the embodiment may reduce the gain of the amplification unit 410-1 by the current limiter 520 under an environment in which high voltage noise is introduced without increasing the size of the feedback capacitor 515. Since the feedback capacitor is not increased in size, the same reduction in noise may be obtained within a small overall circuit area, thus reducing the cost of the sensing unit 30.

Figure 6:
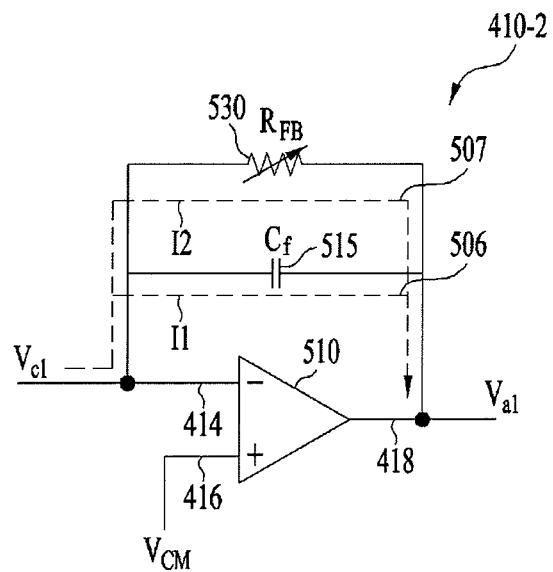
FIG. 6 is a view illustrating another exemplary embodiment of the amplification unit illustrated in FIG. 4.

FIG. 6 is a view illustrating another embodiment 410-2 of the amplification unit 410 illustrated in FIG. 4.

The same reference numerals as those of FIG. 5 designate the same constituent elements and the same constituent elements will be described briefly or not described in order to avoid repetition.

Referring to FIG. 6, the amplification unit 410 may include a variable resistor 530 instead of the current limiter 520 as described above in FIG. 5.

The variable resistor 530 may be electrically connected between the first input terminal 414 and the output terminal 418 of the amplifier 510. For example, the variable resistor 530 and the feedback capacitor 515 may be connected in parallel between the first input terminal 414 and the, output terminal 418 of the amplifier 510.

The variable resistor 530 may have a variable resistance value and create the second current path 507 between the first input terminal 414 and the output terminal 418 of the amplifier 510.

The variable resistor 530, by virtue of the variability of its resistance value, may adjust the second current I2 flowing in the second current path 507.

Figure 7:
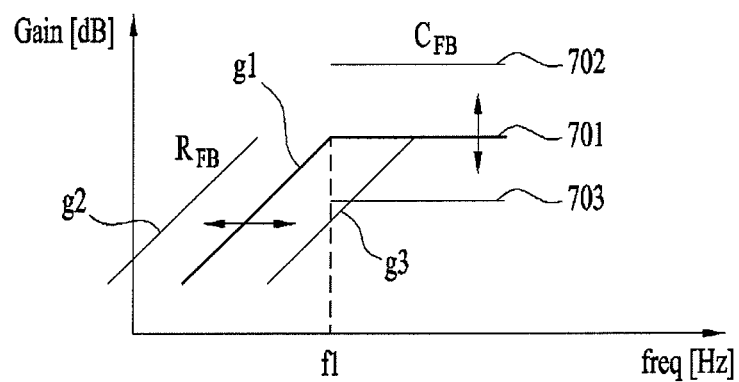
FIG. 7 is a view illustrating the gain of the amplification unit based on variation in the resistance value of a variable resistor illustrated in FIG. 6 in accordance with some exemplary embodiments.

FIG. 7 is a view illustrating the gain of the amplifier 510 based on variation in the resistance value of the variable resistor 530 illustrated in FIG. 6.

"g1" represents a gain depending on a frequency when the variable resistor 530 has a first resistance value. "g2" represents a gain depending on a frequency when the variable resistor 530 has a resistance value less than the first resistance value. "g3" represents a gain depending on a frequency when the variable resistor 530 has a resistance value greater than the first resistance value.

Referring to FIG. 7, as a frequency increases, the gain of the amplifier 510 may linearly increase and converge upon a given value at a specific frequency f1. As the gain of the amplifier converges upon the given value at the frequency f1, the given value at which the convergence occurs may vary based on a capacitance value of the feedback capacitor as exemplarily illustrated in FIG. 7. The gain of the amplifier 510 based on a frequency may vary based on a variation in the resistance value of the variable resistor 530 as described above.

In some embodiments, under an environment in which high voltage noise is introduced to the amplification unit 410-2 of the sensing unit 30, it is possible to reduce the current I1 flowing to the feedback capacitor 515 through an additional current path created by the variable resistor 530 without increasing a capacitance value of the feedback capacitor 515. Reducing the current I1 in this manner may result in a reduction in the gain of the amplification unit 410-2.

That is, embodiments may reduce the gain of the amplification unit 410-2 using the variable resistor 530 in an environment in which high voltage noise is introduced, without increasing the area of the feedback capacitor 515 and, consequently, without increasing the circuit area or the price of the sensing unit 30.

Figure 8:
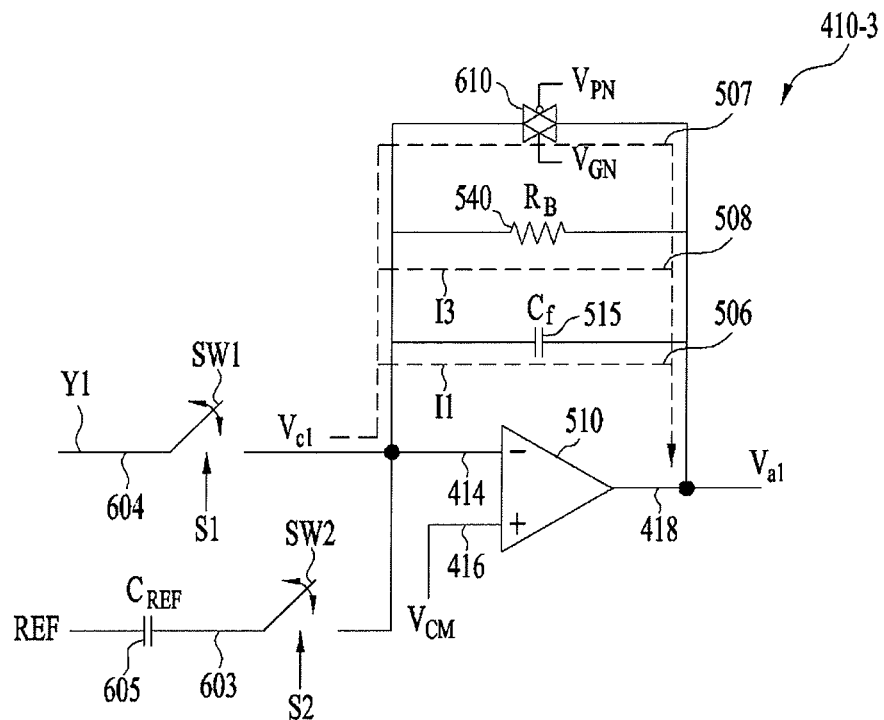
FIG. 8 is a view illustrating a further exemplary embodiment of the amplification unit illustrated in FIG. 4.

FIG. 8 is a view illustrating a further exemplary embodiment 410-3 of the amplification unit 410 illustrated above with respect to FIG. 4.

The same reference numerals as those of FIG. 5 designate the same constituent elements and the same constituent elements will be described briefly or not described in order to avoid repetition.

Referring to FIG. 8, the amplification unit 410-3 may include the amplifier 510, the feedback capacitor 515, a pass transistor 610, a feedback resistor 540, first and second switches SW1 and SW2, and a reference capacitor 605. The amplifier 510 and the feedback capacitor 515 may be equal to those as described above in FIG. 5.

The pass transistor 610 may be electrically connected between the first input terminal 414 and the output terminal 418 of the amplifier 510. The pass transistor 610 may transmit a signal from the first input terminal 414 to the output terminal 418 in response to a first control signal $V_{PN}$ and a second control signal $V_{GN}$.

For example, the pass transistor 610 may include a NMOS transistor and a PMOS transistor.

The pass transistor 610 may vary an ON-resistance according to the magnitude of a received signal $V_{c1}$. The ON-resistance may refer to a resistance value in an ON state of the pass transistor 610.

When an output $V_{a1}$ of the amplifier 510 varies, the ON-resistance based on a source voltage of the pass transistor 610 may vary. Through variation in ON-resistance, the output $V_{a1}$ of the amplifier 510 may be controlled to output within a given signal range.

When the output $V_{a1}$ of the amplifier 510 increases, the ON-resistance of the pass transistor 610 may decrease and current transmitted to the feedback capacitor 515 may decrease. Then, as the current transmitted to the feedback capacitor 515 decreases, the increased output of the amplifier 510 may decrease. On the other hand, when the output $V_{a1}$ of the amplifier 510 decreases, the ON-resistance of the pass transistor 610 may increase and current transmitted to the feedback capacitor 515 may increase, which may cause increase in the reduced output of the amplifier 510.

In the exemplary embodiment, when high voltage noise is introduced to the amplification unit 410-3 of the sensing unit 30, it is possible to reduce current I1 flowing to the feedback capacitor 515 through the additional current path 507 created by the pass transistor 610 without increasing a capacitance value of the feedback capacitor 515. Reducing the current I1 in this manner may result in a reduction in the gain of the amplification unit 410-3.

That is, exemplary embodiments may reduce the gain of the amplification unit 410-3 by the pass transistor 610 when high voltage noise is introduced without increasing the area of the feedback capacitor 515 and, consequently, the same noise reduction may be provided without a corresponding increase in the circuit area.

The first switch SW1 is connected between the sensing line Y1 and the first input terminal 414 of the amplifier 510 and is switched in response to a first switching control signal S1. For example, the first switch SW1 may be a transistor which may be turned on or off in response to the first switching control signal S1.

The second switch SW2 is connected between the reference capacitor 605 and the first input terminal 414 of the amplifier 510 and may be switched in response to a second switching control signal S2.

For example, the second switch SW2 may electrically connect or separate one end of the reference capacitor 605 to or from the first input terminal 414 of the amplifier 510 in response to the second switching control signal S2.

A reference voltage VREF may be applied to the other end of the reference capacitor 605. The reference capacitor 605 may be a predetermined capacitor used for error correction as described in further detail below.

Figure 9:
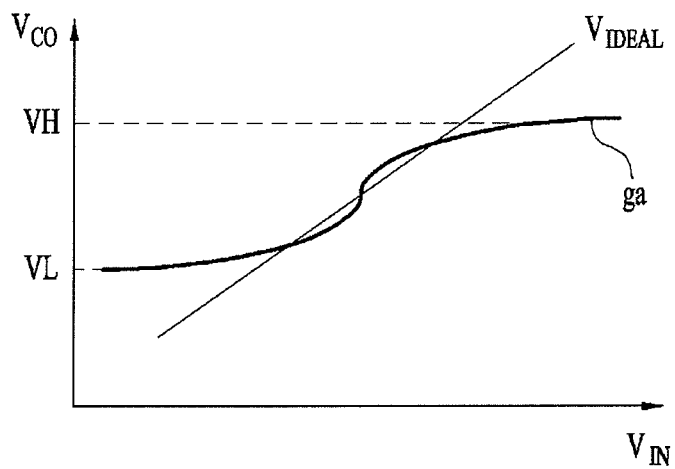
FIG. 9 is a graph illustrating an input and output of a pass transistor in accordance with some exemplary embodiments.

FIG. 9 is a graph illustrating an input $V_{IN}$ and output $V_{CO}$ of the pass transistor 610.

Referring to FIG. 9, the input $V_{IN}$ and the output $V_{CO}$ of the pass transistor 610 may have a nonlinear relationship. For example, when a value of the input $V_{IN}$ of the pass transistor 610 increases, the output $V_{CO}$ of the pass transistor 610 may increase in a nonlinear manner and converge upon an upper limit VH. At this time, the upper limit VH may be a voltage of the second control signal $V_{GN}$.

In addition, when a value of the input $V_{IN}$ of the pass transistor 610 decreases, the output $V_{CO}$ of the pass transistor 610 may nonlinearly decrease and converge upon a lower limit VL. At this time, the lower limit VL may be a voltage of the first control signal $V_{PN}$.

In conclusion, the output of the pass transistor 610 may be limited to a given range, and the gain of the amplification unit 410-3 may automatically be limited to a given range.

The feedback resistor 540 may be electrically connected between the first input terminal 414 and the output terminal 418 of the amplifier 510 and create a third current path 508 from the first input terminal 414 to the output terminal 418. Third current I3 may flow in the third current path 508.

The feedback resistor 540 may serve to provide negative feedback to the output signal $V_{a1}$ of the amplifier 510 to the first input terminal 414.

For example, the feedback capacitor 515, the feedback resistor 540, and the pass transistor 610 may be connected in parallel between the first input terminal 414 and the output terminal 418 of the amplifier 510.

In addition, as the driving lines are driven using two or more signals having opposite phases, the magnitude of a signal transmitted to the sensing unit 30 may be kept at a small value which may minimize an error of the sensing unit 30 depending on the sensing process employed and a local temperature.

Although a threshold voltage of the pass transistor 610 may be greatly affected by a process or temperature, by keeping the magnitude of the signal transmitted to the sensing unit 30 at a small value, the pass transistor 610 may reduce an error of the sensing unit 30 due to the effects of a process and temperature.

Although the output $V_{a1}$ of the amplification unit 410-3 may have a harmonic component because of a nonlinear relationship between the input $V_{IN}$ and the output $V_{CO}$ of the pass transistor 610, the digital signal processor 320 may filter and remove the harmonic component.

In addition, as the driving lines are driven using two or more driving signals having opposite phases, the output of the sensing unit 30 may be reduced, which may reduce process and drift errors.

The capacitance value Cf of the feedback capacitor 515 may be adjusted to compensate for an error in the gain of the amplification unit 410-3 caused by variation in the threshold voltage of the NOMS transistor and variation in the threshold voltage of the PMOS transistor of the pass transistor 610.

Figure 10:
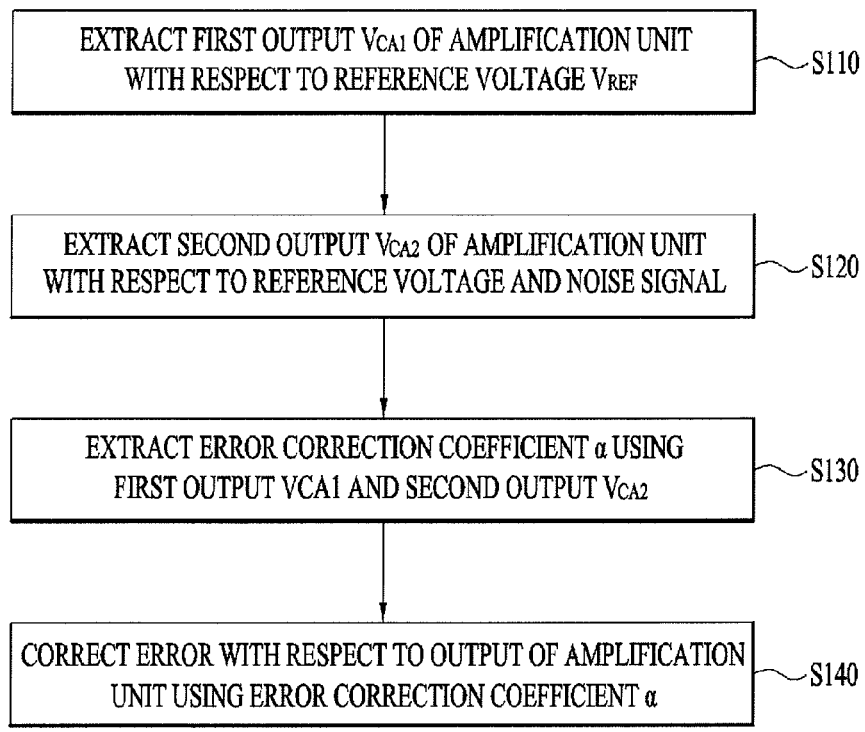
FIG. 10 is a view illustrating an error compensation method with respect to the gain of the amplification unit depending on variation in the threshold voltages of NMOS and PMOS transistors of the pass-transistor in accordance with some exemplary embodiments.

FIG. 10 is a view illustrating an error compensation method with respect to the gain of the amplification unit 410-3 caused by variation in the threshold voltages of NMOS and PMOS transistors of the pass-transistor 610.

Referring to FIG. 10, a first output $V_{CA1}$ of the amplification unit 410-3 with respect to a reference voltage $V_{REF}$ is extracted (S110).

The first output $V_{CA1}$ may be an output of the amplification unit 410-3 with respect to the reference voltage $V_{REF}$ applied to the first input terminal 414 of the amplification unit 410-3 through the first path 603. At this time, the first path 603 may be a path separated from or independent of the touch panel 10 and may include the reference capacitor 605 having a reference capacitance $C_{REF}$.

Subsequently, with respect to the reference voltage $V_{REF}$ applied to the first input terminal 414 of the amplification unit 410-3 through the first path 603 and a noise signal introduced through the second path 604 to which no driving signal $V_{d1}$ is applied, a second output $V_{CA2}$ of the amplification unit 410-3 is extracted (S120). At this time, the second path 604 may be the driving lines X1 to Xn, where n is a natural number greater than 1, and the sensing lines Y1 to Ym, where m is a natural number greater than 1, connected to the driving lines of the touch panel 10.

Subsequently, an error correction coefficient α is acquired via a digital signal processing of the first output $V_{CA1}$ and the second output $V_{CA2}$ (S130).

For example, a frequency signal component of the first output $V_{CA1}$ (hereinafter referred to as a "first frequency signal component") corresponding to a frequency of the reference voltage $V_{REF}$ is extracted from a frequency domain, and a frequency signal component of the second output $V_{CA2}$ (hereinafter referred to as a "second frequency signal component") corresponding to a frequency of the reference voltage $V_{REF}$ is extracted from the frequency domain.

The error correction coefficient α may be acquired by dividing the second frequency signal component by the first frequency signal component.

Subsequently, with respect to the driving signal $V_{d1}$ applied to the first input terminal 414 of the amplification unit 410-3 through the second path 604 and a noise signal introduced through the second path 604, a third output $V_{CA3}$ of the amplification unit 410-3 is extracted and error correction for the third output $V_{CA3}$ is performed using the error correction coefficient α (S150).

For example, an error corrected output of the amplification unit 410-3 may be extracted based on a result acquired by dividing the third output $V_{CA3}$ by the error correction coefficient α.

Figure 11A:
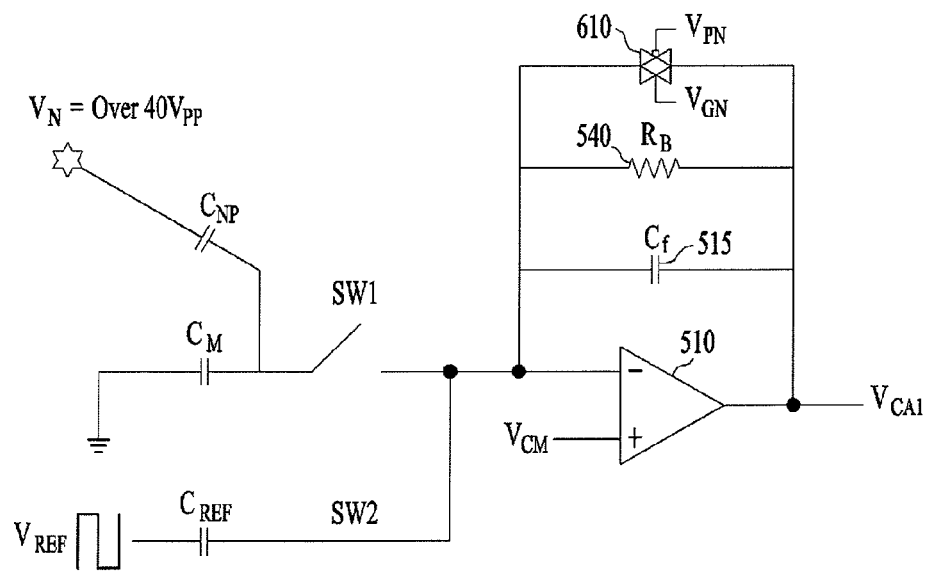
FIGS. 11A to 11C are views illustrating an operation of implementing error compensation of FIG. 10 by the amplification unit illustrated in FIG. 8 in accordance with some exemplary embodiments.
Figure 11B:
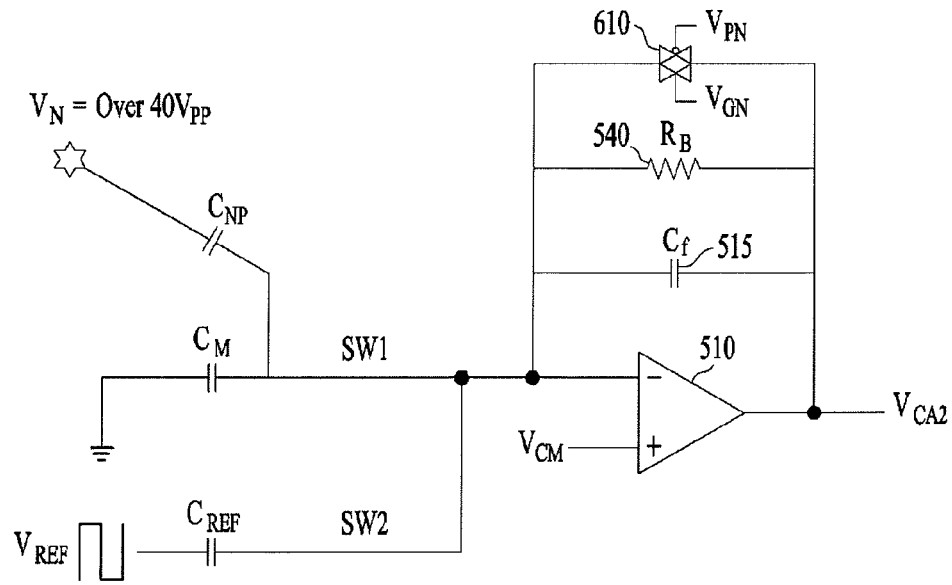
Figure 11C:
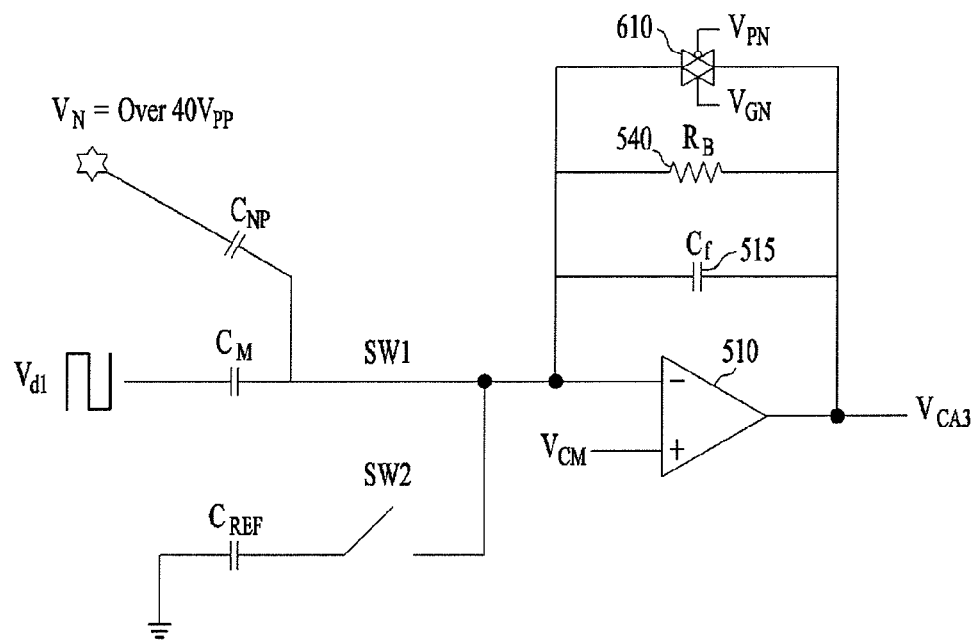

FIGS. 11A to 11C are views illustrating an operation of implementing error compensation of FIG. 10 by the amplification unit 410-3 illustrated in FIG. 8.

Referring to FIG. 11A, when a driving signal $V_{d1}$ is not applied to the driving line Y1, the first switch SW1 is open, and the second switch SW2 is closed, the first output $V_{CA1}$ of the amplification unit 410-3 is extracted.

The first output $V_{CA1}$ may be an output of the amplification unit 410-3 with respect to the reference signal $V_{REF}$. For example, the first output $V_{CA1}$ may be an output of the amplification unit 410-3 when no noise component CNP is included in the input of the amplification unit 410-3.

The first output $V_{CA1}$ may be extracted by the following Equation 1:

$$VCA1 = VREF \times \frac{CREF}{Cf} \qquad \text{(Equation 1)}$$

"$V_{REF}$" is a reference signal, "$C_{REF}$" is a capacitance of the reference capacitor, and "cf" is a capacitance of the feedback capacitor.

Referring to FIG. 11B, in a state in which no driving signal $V_{d1}$ is applied to the driving line Y1 and both the first switch SW1 and the second switch SW2 are closed, the second output $V_{CA2}$ of the amplification unit 410-3 is extracted.

The second output $V_{CA2}$ may be a nonlinear output of the amplification unit 410-3 when noise is introduced into the input of the amplification unit 410-3 through the touch panel 10.

The second output $V_{AC2}$ may be extracted by the following Equation 2:

$$VCA2 = \alpha \times VREF \times \frac{CREF}{Cf} + \alpha \times VN \times \frac{CNP}{Cf} \quad \text{(Equation 2)}$$

"α" is a proportional coefficient with respect to a nonlinear gain. In other words, "α" may mean an error correction coefficient to correct a nonlinear output into a linear output. "VN" is a voltage of introduced noise, and "CNP" is a parasitic capacitance of the touch panel 10 caused by noise.

The error correction coefficient α is acquired by digital signal processing the first output $V_{CA1}$ and the second output $V_{CA2}$.

Referring to FIG. 11C, in a state in which the driving signal $V_{d1}$ is applied to the driving line Y1, the first switch SW1 is closed and the second switch SW2 is open, the third output $V_{CA3}$ of the amplification unit 410-3 is extracted. At this time, the third output $V_{CA3}$ of the amplification unit 410-3 may be a nonlinear output.

The third output $V_{CA3}$ may be extracted by the following Equation 3:

$$VCA3 = \alpha \times Vd1 \times \frac{CM}{Cf} + \alpha \times VN \times \frac{CNP}{Cf} \quad \text{(Equation 3)}$$

"$V_{d1}$" is a voltage of a driving signal, and "CM" is a mutual capacitance.

The nonlinear third output $V_{CA3}$ may be corrected into the linear output $V_{CA}$ using the error correction coefficient α. For example, the error corrected output $V_{CA}$ may be acquired by dividing the third output $V_{CA3}$ by the error correction coefficient α.

Through the error correction as described above in FIGS. 11A to 11C, it is possible to reduce the effect of nonlinear characteristics and a process or temperature to the output of the amplification unit 410-3.

As is apparent from the above description, the embodiments are capable of reducing the gain of an amplification unit and reducing the circuit area and price of a sensing unit under an environment in which high voltage noise is introduced without increasing the area of a feedback capacitor.

Features, structures, effects, and the like as described above in the embodiments are included in at least one embodiment of the present invention and should not be limited to only one embodiment.

In addition, the features, structures, effects, and the like described in the respective embodiments may be combined or modified even with respect to the other embodiments by those skilled in the art. Accordingly, contents related to these combinations and modifications should be construed as within the scope of the present invention.

What is claimed is:

1. A touch sensor comprising:
    a touch panel including driving lines and sensing lines, wherein a node capacitor is formed between the neighboring driving and sensing lines; and
    a sensing unit electrically connected to the sensing lines to sense variation in the capacitance of the node capacitor,
    wherein the sensing unit comprises:
    an amplifier including a first input terminal configured to receive a signal from any one of the sensing lines, a second input terminal connected to a first power source, and an output terminal;
    a feedback capacitor connected between the first input terminal and the output terminal; and
    a pass transistor connected in parallel to the feedback capacitor between the first input terminal and the output terminal and operated in response to a first control signal and a second control signal,
    wherein an ON-resistance of the pass transistor is varied according to a magnitude of a signal input to the first input terminal and ON-resistance is a resistance value in an ON state of the pass transistor, and
    wherein the ON-resistance based on a source voltage of the pass transistor is varied based on variation of an output of the amplifier.

2. The touch sensor according to claim 1, wherein the pass transistor is a constant current limiter configured to supply a predetermined current.

3. The touch sensor according to claim 2, wherein the pass transistor is a variable resistor operable to supply a variable resistance value.

4. The touch sensor according to claim 1, wherein the pass transistor further comprises a feedback resistor connected between the first input terminal and the output terminal, wherein the feedback resistor is connected in parallel to the pass transistor and the feedback capacitor.

5. The touch sensor according to claim 1, wherein current introduced to the first input terminal is divided into a first current flowing to the feedback capacitor and a second current flowing to the pass transistor.

6. The touch sensor according to claim 1, wherein an input and an output of the pass transistor have an nonlinear relationship.

7. The touch sensor according to claim 6, wherein when a value of the input of the pass transistor increases, the output of the pass transistor increases in a nonlinear manner and converges upon an upper limit.

8. The touch sensor according to claim 7, wherein the upper limit is a voltage of the second control signal.

9. The touch sensor according to claim 6, wherein when a value of the input of the pass transistor decreases, the output of the pass transistor decreases in a nonlinear manner and converges upon a lower limit.

10. The touch sensor according to claim 9, wherein the lower limit is a voltage of the first control signal.

11. The touch sensor according to claim 1, wherein the signal input to the first input terminal is a signal received from one of the sensing lines.

12. The touch sensor according to claim 1, wherein when an output of the amplifier increases, the ON-resistance of the pass transistor decreases.

13. The touch sensor according to claim 12, wherein when the output of the amplifier decreases, the ON-resistance of the pass transistor increases.

14. The touch sensor according to claim 1, wherein the pass transistor includes a NMOS transistor and a PMOS transistor.

15. The touch sensor according to claim 1, further comprises a driving unit providing driving signals to at least one or more driving lines among the driving lines.

* * * * *